United States Patent
Adachi (10) Patent No.: US 8,256,129 B2
(45) Date of Patent: Sep. 4, 2012

(54) TEST INDICATOR

(75) Inventor: Kouichi Adachi, Ena (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 13/086,614

(22) Filed: Apr. 14, 2011

(65) Prior Publication Data

US 2011/0271538 A1 Nov. 10, 2011

(30) Foreign Application Priority Data

May 10, 2010 (JP) ................................. 2010-108151

(51) Int. Cl.
*G01B 5/24* (2006.01)

(52) U.S. Cl. .............................. 33/556; 33/1 N; 33/1 PT (58) Field of Classification Search ..................... 33/1 N, 33/1 PT, 534, 556, 792, 794, 797, 798, 799
See application file for complete search history.

(56) References Cited

U.S. PATENT DOCUMENTS

| | | | | | |
|---|---|---|---|---|---|
| 2,421,517 | A | * | 6/1947 | Moerman | 33/797 |
| 2,755,557 | A | * | 7/1956 | Witchger | 33/556 |
| 5,960,553 | A | * | 10/1999 | Ishii et al. | 33/556 |
| 6,546,643 | B2 | * | 4/2003 | Lotze et al. | 33/559 |
| 2003/0182809 | A1 | * | 10/2003 | Enzinna | 33/1 PT |
| 2005/0217126 | A1 | * | 10/2005 | Inoue | 33/1 PT |
| 2009/0031569 | A1 | * | 2/2009 | Schirp et al. | 33/1 N |
| 2011/0000744 | A1 | * | 1/2011 | Smith | 33/1 PT |
| 2011/0083335 | A1 | * | 4/2011 | Yasuno et al. | 33/556 |

FOREIGN PATENT DOCUMENTS

JP 6-109401 4/1994

* cited by examiner

*Primary Examiner* — G. Bradley Bennett
(74) *Attorney, Agent, or Firm* — Greenblum & Bernstein P.L.C.

(57) ABSTRACT

A plurality of types of body cases, a movement unit housed inside each of the body cases, and a dial unit are provided. The movement unit is configured to include a gauge head swingably supported by a movement frame; a crown gear rotatably supported by the movement frame; and a magnifying transmission mechanism magnifying and transmitting a swing amount of the gauge head to a rotation amount of the crown gear. The dial unit is configured to include an indicating needle rotatably provided in a dial frame; a scale plate provided along a rotation area of the indicating needle; and a pinion transmitting rotation of the crown gear to the indicating needle.

6 Claims, 9 Drawing Sheets

TEST INDICATOR

CROSS-REFERENCE TO RELATED APPLICATIONS

The present application claims priority under 35 U.S.C. §119 of Japanese Application No. 2010-108151, filed on May 10, 2010, the disclosure of which is expressly incorporated by reference herein in its entirety.

BACKGROUND OF THE INVENTION

1. Field of the Invention

The present invention relates to a test indicator displaying a swing amount of a gauge head as a rotation amount of an indicating needle.

2. Description of Related Art

Among test indicators that display a swing amount of a gauge head as a rotation amount of an indicating needle, one is known to have a configuration in which a movement is unitized (see a conventional example illustrated in FIGS. 6-8 of Japanese Patent Laid-Open Publication No. H06-109401). This test indicator includes a body case; a gauge head swingably supported by the body case; a dial unit mounted on the body case; and a movement housed in the body case and magnifying a swing motion of the gauge head to transmit the magnified swing motion to the dial unit. A gauge head insertion opening to which the gauge head is inserted and an axis bearing that swingably supports an axis of the gauge head are formed at a foremost end of the body case, and a recess that houses the movement is formed inside the body case.

The gauge head is swingably supported at a middle part thereof by the body case, and has a contacting ball on a foremost end side beyond the supporting point and a first arm on a base end side. The dial unit is configured as one unit to include a unit body, an indicating needle rotatably provided in the unit body, a scale plate provided in the unit body along a rotation area of the indicating needle, and a pinion mounted on an axis of the indicating needle. The movement includes a pair of holding plates, a crown gear rotatably held between the pair of the holding plates and having a coaxial pinion, and a second arm rotatably held between the pair of the holding plates and having a sector gear at a foremost end side engaging the pinion of the crown gear. The second arm has a supporting axis on a base end side rotatably supported in the body case, and has a pair of transmission pins upwardly implanted thereon, one on each side of the supporting axis, the pair of the transmission pins being brought into contact with the first arm from mutually opposite sides.

Upon assembling, the dial unit and the movement unit are each assembled in advance. First, the movement is housed inside the body case and fixed in the body case with screws and the like. Thereafter, the gauge head is inserted from the gauge head insertion opening and the axis thereof is supported between a pair of axis bearings. In this case, the foremost end of the first arm is inserted from between the pair of holding plates of the movement in a manner not to interfere with the supporting axis and the transmission pins. Next, the recess of the body case is covered with a cover or the like. Finally, the dial unit is mounted on a long lateral face of the body case. In this case, the pinion of the dial unit is brought to engage the crown gear.

In the structure of the conventional test indicator, the movement is formed in advance having gears, the second arm and the like installed between the two holding plates. Therefore, after the movement is installed in the recess of the body case, it is necessary to install the gauge head having the first arm to the body case. However, the first arm has a complex shape, and the foremost end of first arm has to be inserted from between the two holding plates of the movement in a manner not to interfere with the supporting axis and the transmission pins. Therefore, the installation process requires high proficiency as well as time and effort. Further, in the structure of the conventional test indicator, the gauge head is supported by the body frame, and the gears and the second arm are supported by the two holding plates of the movement. Therefore, inter-axis precision is difficult to ensure, so that high precision requires a lot of adjustment time and labor, resulting in cost increase.

SUMMARY OF THE INVENTION

A non-limiting feature of the present disclosure is to provide a test indicator allowing easy assembly without the need of proficiency while enabling high precision.

A test indicator of a non-limiting feature of the present disclosure displays a swing amount of a gauge head as a rotation amount of an indicating needle. The test indicator includes a body case, a movement unit housed in the body case, and a dial unit mounted on the body case. The movement unit is configured as one unit to include a movement frame, the gauge head swingably supported by the movement frame, an indicating needle driving gear rotatably supported by the movement frame, and a magnifying transmission mechanism magnifying the swing amount of the gauge head provided in the movement frame to transmit the magnified swing amount into a rotation amount of the indicating needle driving gear. The dial unit is configured as one unit to include a dial frame, the indicating needle rotatably provided in the dial frame, a scale plate provided in the dial frame along a rotation area of the indicating needle, and a pinion supported by the dial frame and transmitting rotation of the indicating needle driving gear to the indicating needle.

According to such a configuration, the movement unit is configured as one unit to include the movement frame, the gauge head, the indicating needle driving gear and the magnifying transmission mechanism. Therefore, when assembling the movement unit, the gauge head can also be installed together in the movement unit. Therefore, the assembling process of the gauge head can easily be performed without the need of proficiency. That is, it is not necessary to insert a gauge head having a first arm into a body case from a gauge head insertion opening after a movement is installed in a recess of a body case, as in the conventional way. Therefore, the problem associated therewith can be resolved. Further, only the gauge head, the indicating needle driving gear and the magnifying transmission mechanism are installed in the movement frame. Therefore, inter-axis precision of these parts is easily ensured. As just described, after the movement unit is assembled, the movement unit is installed in the body case. When the dial unit is installed on the body case and the pinion of the dial unit is brought to be engaged with the indicating needle driving gear, a test indicator is assembled. Therefore, the assembling process can easily be performed without the need of proficiency.

In the test indicator of a non-limiting feature of the present disclosure, it is preferred that the movement frame includes a pair of pressed ground planes and a spacer held between the pair of the ground planes, and the gauge head, the indicating needle driving gear and the magnifying transmission mechanism are held between the pair of the ground planes.

According to such a configuration, the movement frame is configured to include the pair of the pressed ground planes, and the gauge head, the indicating needle driving gear and the magnifying transmission mechanism are held between the pair of the ground planes. That is, axis bearings can be pressed for holding the gauge head, the indicating needle driving gear and the magnifying transmission mechanism between the pair of the ground planes. Therefore, high inter-axis precision work can be performed. Therefore, each element can be made of high inter-axis precision, which enables realization of high precision.

In the test indicator of a non-limiting feature of the present disclosure, it is preferred that the indicating needle driving gear is a crown gear rotatable centered on an axis parallel to a swing axis of the gauge head; the pinion is configured to be rotatable centering on an axis perpendicular to a rotation axis of the crown gear; and the body case is selected from a plurality of types of body cases each having an aperture formed on a wall surface facing a different tooth position of the crown gear.

According to such a configuration, via engagement between the crown gear and the pinion, a swing movement of the gauge head is transmitted to rotation of the indicating needle of the dial unit. Therefore, the pinion can be engaged with the crown gear in a state in which the pinion has been rotated for a predetermined angle centering on a rotation axis of the crown gear. Therefore, the orientation of the dial unit with respect to the body case can be changed while maintaining an engaging relation between the crown gear and the pinion. Therefore, by preparing body cases in different shapes, test indicators each having a differently oriented dial unit can be configured. That is, by changing only the body case, a test indicator having a differently oriented dial unit can be configured. Therefore, a test indicator suitable for an intended purpose can be provided at low cost.

In the test indicator of a non-limiting feature of the present disclosure, it is preferred that, for the body case, a first body case, a second body and a third body case are prepared. The first body case has the aperture formed on a wall surface perpendicular to a gauge head axis line of the gauge head in a neutral state and a swing axis of the gauge head. The second body case has the aperture formed on a wall surface inclining with respect to the gauge head axis line and the swing axis. The third body case has the aperture formed on a wall surface perpendicular to the gauge head axis line and parallel to the swing axis.

According to such a configuration, when the first body case is used, a test indicator can be configured in which a display surface of the dial unit is in a direction parallel to the neutral gauge head axis line of the gauge head and the swing axis of the gauge head. When the second body case is used, a test indicator can be configured in which the display surface of the dial unit is in a direction inclining with respect to the neutral gauge head axis line and the swing axis. When the third body case is used, a test indicator can be configured in which the display surface of the dial unit is in a direction perpendicular to the neutral gauge head axis line.

BRIEF DESCRIPTION OF THE DRAWINGS

The present disclosure is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description is taken with the drawings making apparent to those skilled in the art how the forms of the present invention may be embodied in practice.

In the following, an embodiment of the present invention is explained based on the drawings.

<Explanation of Overall Configuration>

Figure 1:
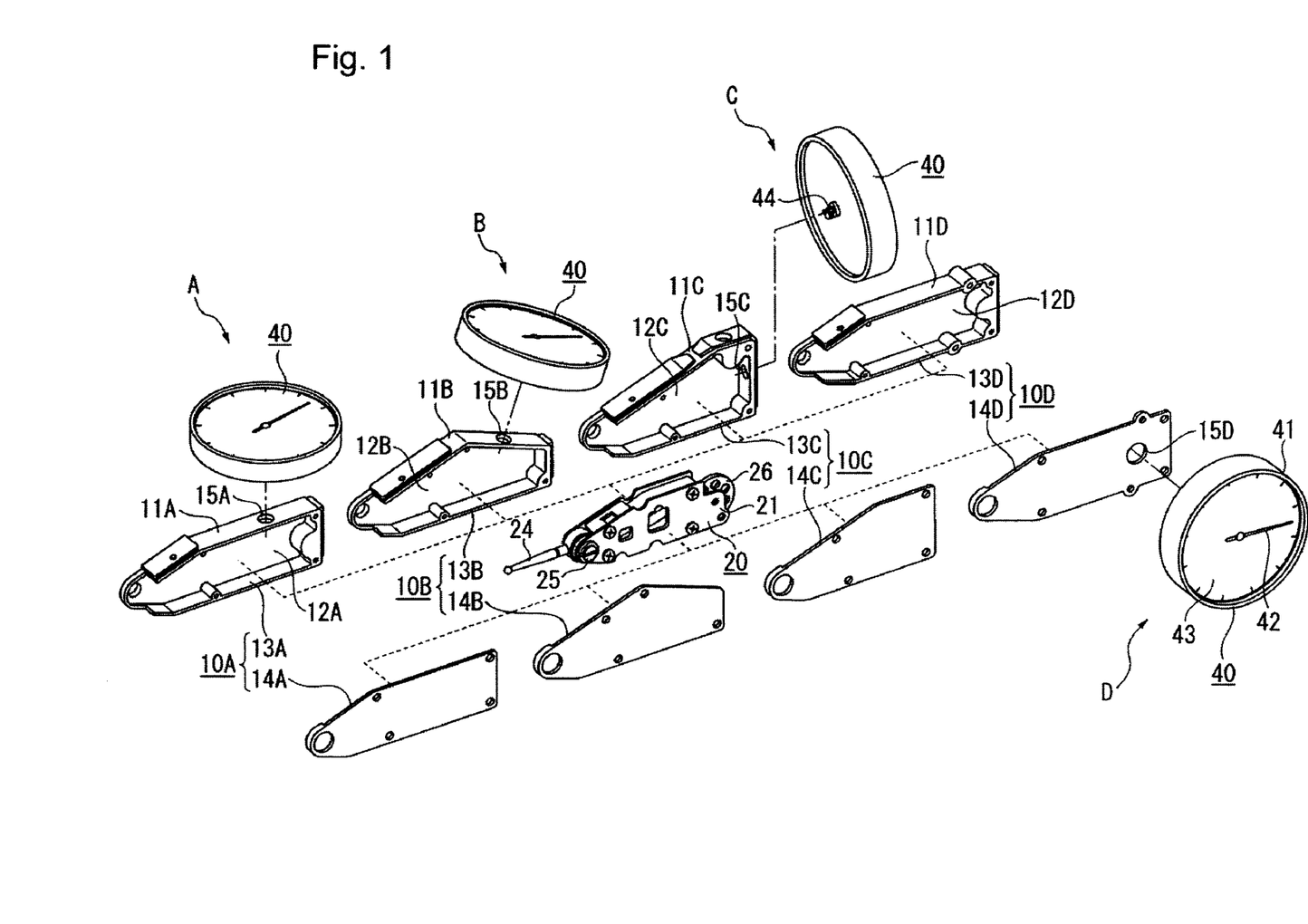
FIG. 1 is an exploded perspective view of a test indicator according to an embodiment of the present disclosure.

As FIG. 1 illustrates, in the present embodiment, by making combinations between four types of body cases 10A-10D, one type of a movement unit 20 common to the four types of the body cases 10A-10D, and one type of a dial unit 40 mounted on an outer surface of each of the body cases 10A-10D, four types of test indicators, that is, a longitudinal type test indicator A, a gradient type test indicator B, a vertical type test indicator C and a horizontal type test indicator D, can be configured in each of which the dial unit 40 has a different orientation (the orientation of a display surface of the dial unit 40) with respect to the body cases 10A-10D. Only for the horizontal type test indicator D, one part of the movement unit 20 needs modification (as will be described in detail later).

Figure 2:
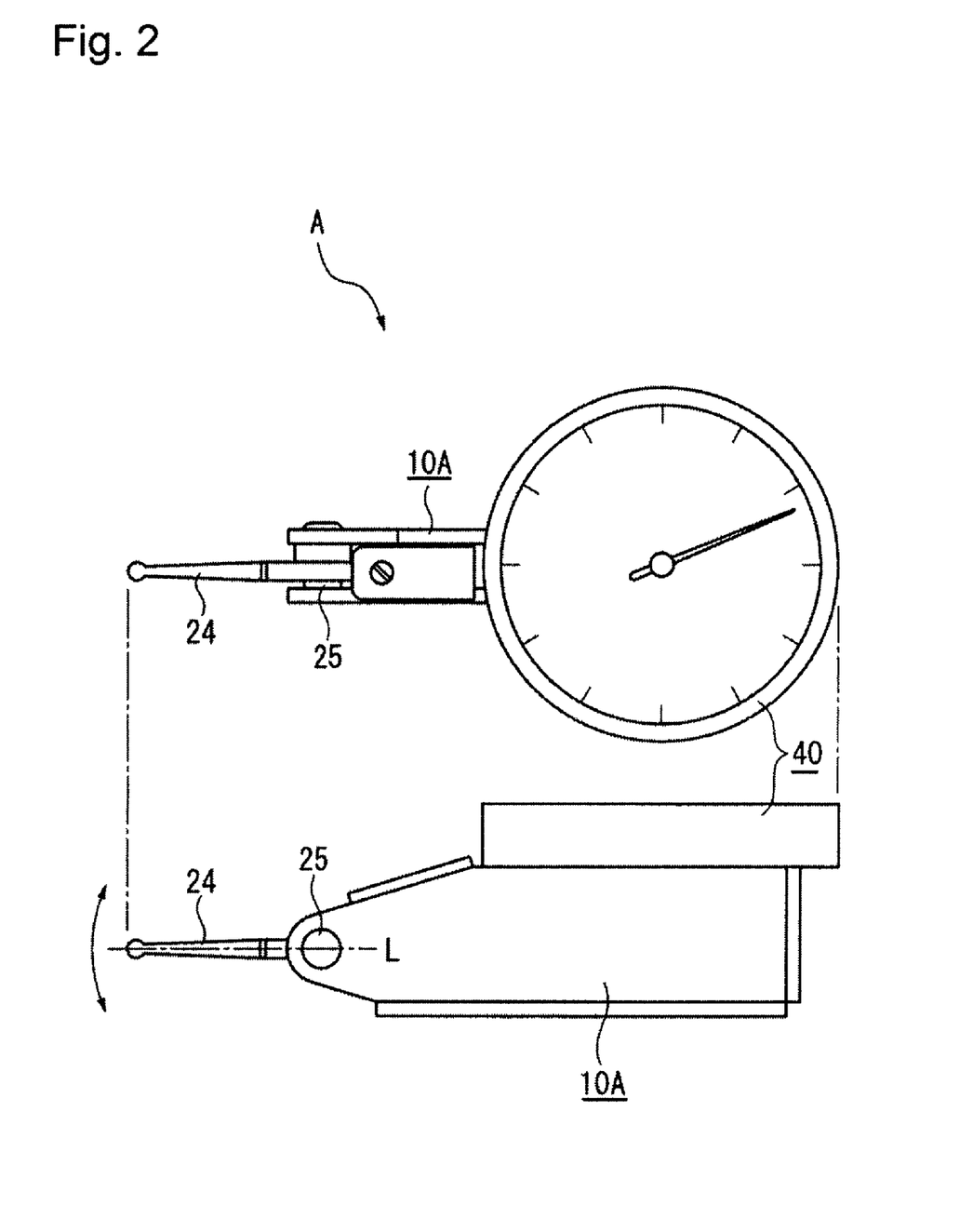
FIG. 2 is a front view and a plan view illustrating a longitudinal type test indicator according to the embodiment.
Figure 3:
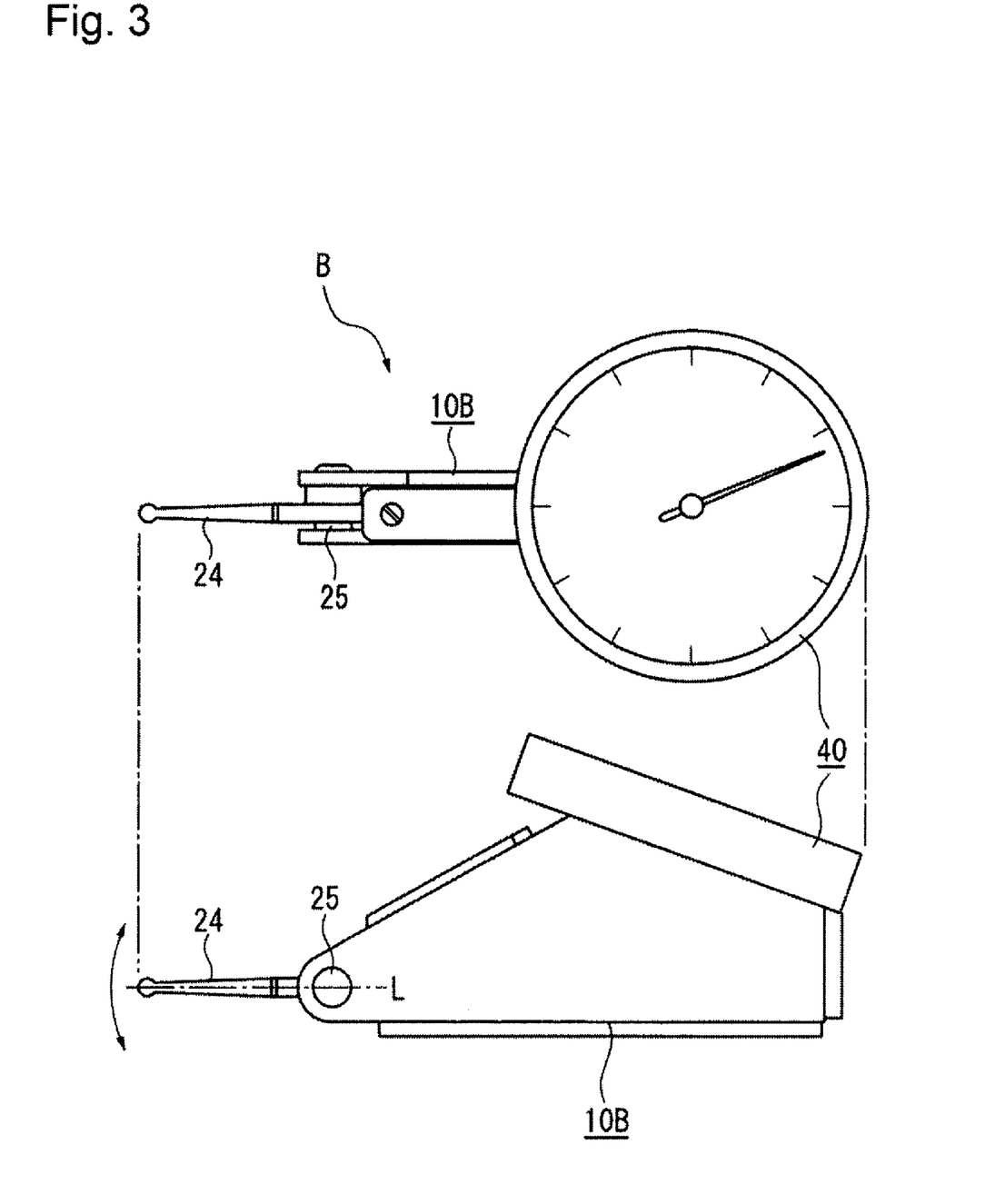
FIG. 3 is a front view and a plan view illustrating a gradient type test indicator according to the embodiment.

The longitudinal type test indicator A is configured with the first body case 10A, the movement unit 20 housed inside the first body case 10A, and the dial unit 40 mounted on the outer surface of the first body case 10A. As FIG. 2 illustrates, the dial unit 40 is mounted on the first body case 10A in a manner such that the display surface of the dial unit faces a direction parallel to a neutral gauge head axis line L of a gauge head 24 (to be described later), which is a part of the movement unit 20, and a swing axis 25 of the gauge head 24 (the neutral gauge head axis line L being an axis line of the gauge head 24 in a state in which the gauge head 24 is not displaced). The gradient type test indicator B is configured with the second body case 10B, the movement unit 20 housed inside the second body case 10B, and the dial unit 40 mounted on the outer surface of the second body case 10B. As FIG. 3 illustrates, the dial unit 40 is mounted on the second body case 10B in a manner such that the display surface of the dial unit faces an inclining direction with respect to the neutral gauge head axis line L and the swing axis 25.

Figure 4:
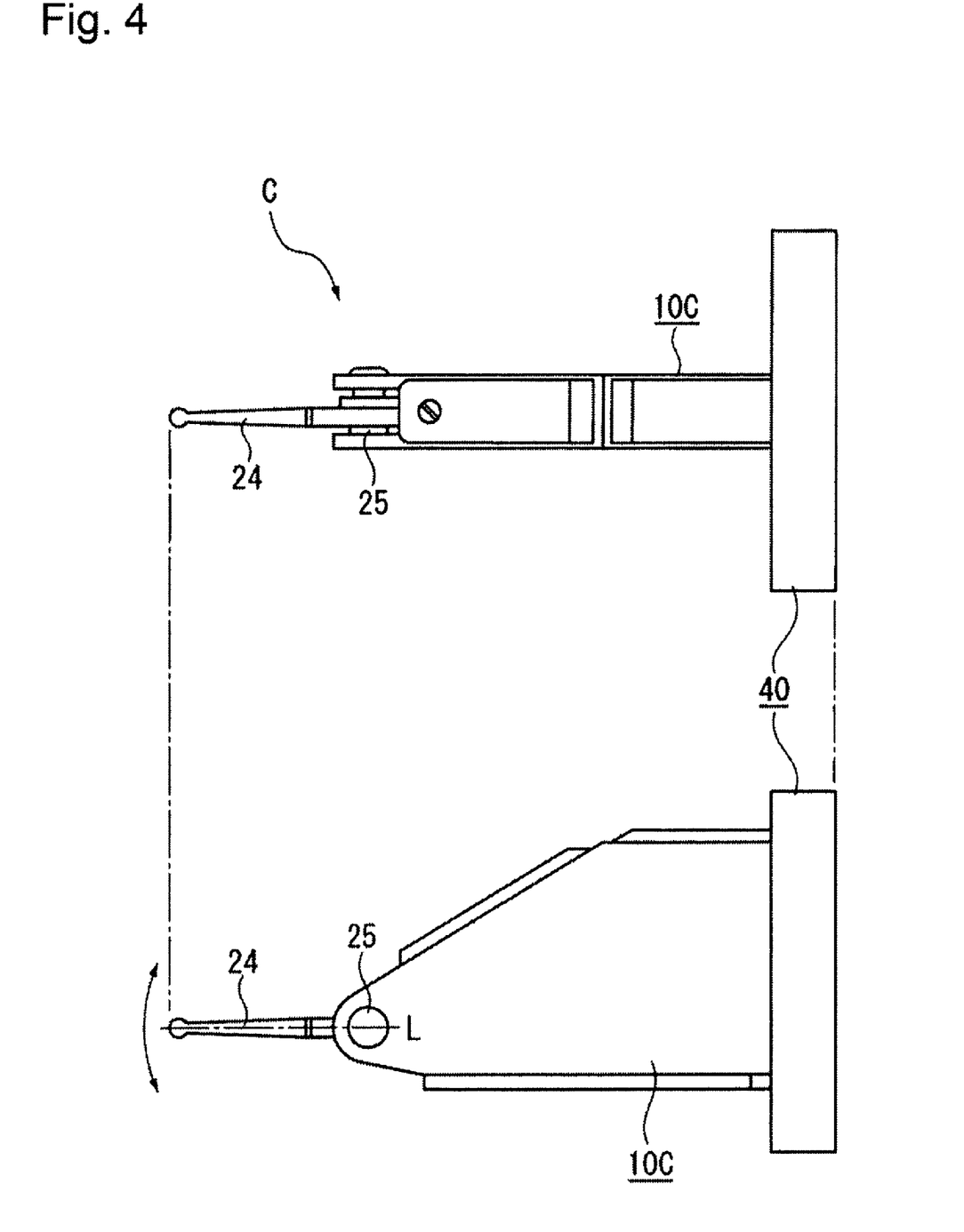
FIG. 4 is a front view and a plan view illustrating a vertical type test indicator according to the embodiment.
Figure 5:
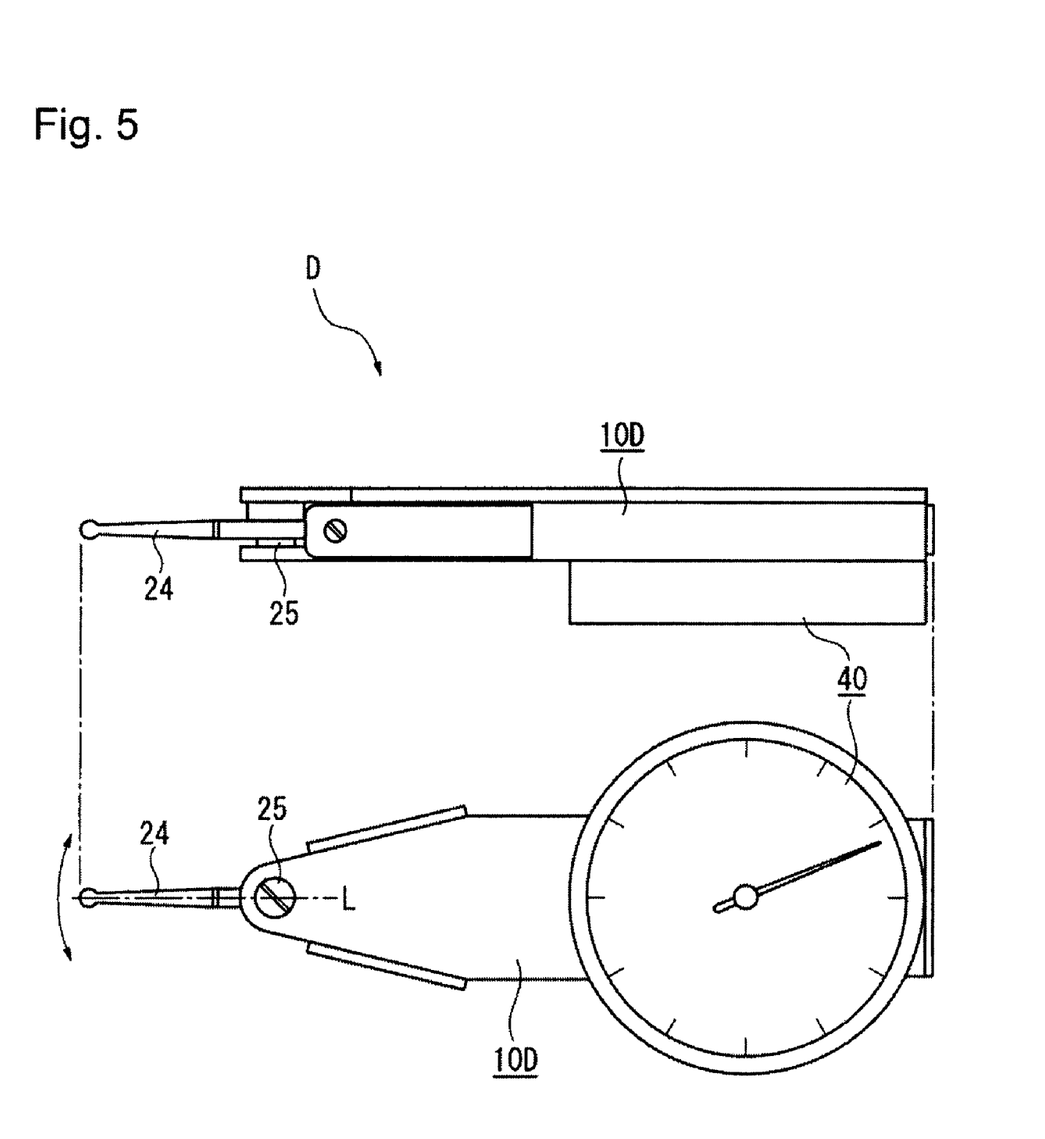
FIG. 5 is a front view and a plan view illustrating a horizontal type test indicator according to the embodiment.

The vertical type test indicator C is configured with the third body case 10C, the movement unit 20 housed inside the third body case 10C, and the dial unit 40 mounted on the outer surface of the third body case 10C. As FIG. 4 illustrates, the dial unit 40 is mounted on the third body case 10C in a manner such that the display surface of the dial unit faces a direction perpendicular to the neutral gauge head axis line L. The horizontal type test indicator D is configured with the fourth body case 10D, the movement unit 20 housed inside the fourth body case 10D, and the dial unit 40 mounted on the outer surface of the fourth body case 10D. As FIG. 5 illustrates, the dial unit 40 is mounted on the fourth body case 10D in a manner such that the display surface of the dial unit faces a direction perpendicular to the neutral gauge head axis line L and parallel to the swing axis 25.

<Explanation of the Body Cases>

The first body case 10A has a shape of a vertically long pentagon having a gradually narrowing foremost end, and includes a body frame 13A and a cover 14A. The body frame 13A has a periphery surrounded by a vertical wall 11A excluding a foremost end portion, and a recess 12A inside therein housing the movement unit 20. The cover 14A covers the recess 12A of the body frame 13A. An aperture 15A is formed on a wall surface at a portion of the vertical wall 11A that is parallel to the neutral gauge head axis line L and the swing axis 25 of the gauge head 24. The second body case 10B has a shape of a vertically long pentagon having a gradually narrowing foremost end, and includes a body frame 13B and a cover 14B. The body frame 13B has a periphery surrounded by a vertical wall 11B excluding a foremost end portion, and a recess 12B inside therein housing the movement unit 20. The cover 14B covers the recess 12B of the body frame 13B. An aperture 15B is formed on a wall surface at a portion of the vertical wall 11B that is inclined with respect to the neutral gauge head axis line L and the swing axis 25 of the gauge head 24.

The third body case 10C has a shape of a vertically long pentagon having a gradually narrowing foremost end, and includes a body frame 13C and a cover 14C. The body frame 13C has a periphery surrounded by a vertical wall 11C excluding a foremost end portion, and a recess 12C inside therein housing the movement unit 20. The cover 14C covers the recess 12C of the body frame 13C. An aperture 15C is formed on a wall surface at a portion of the vertical wall 11C that is perpendicular to the neutral gauge head axis line L of the gauge head 24 and parallel to the swing axis 25 of the gauge head 24. The fourth body case 10D has a shape of a vertically long pentagon having a gradually narrowing foremost end, and includes a body frame 13D and a cover 14D. The body frame 13D has a periphery surrounded by a vertical wall 11D excluding a foremost end portion, and a recess 12D inside therein housing the movement unit 20. The cover 14D covers the recess 12D of the body frame 13D. An aperture 15D is formed on the cover 14D. That is, the aperture 15D is formed on the cover 14D, which is a wall surface parallel to the neutral gauge head axis line L of the gauge head 24 and perpendicular to the swing axis 25 of the gauge head 24.

<Explanation of the Movement Unit>

Figure 6:
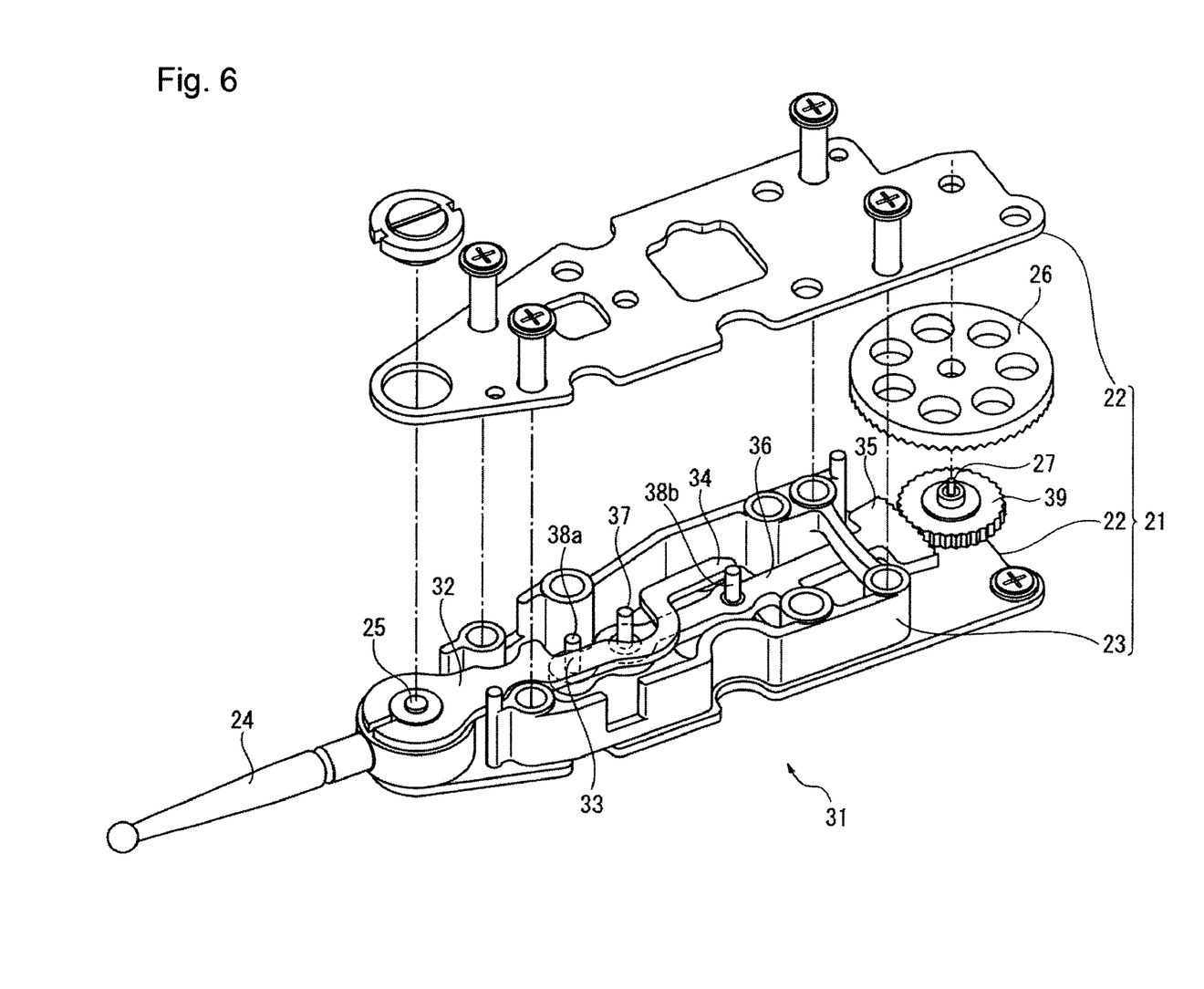
FIG. 6 is an exploded perspective view illustrating a movement unit according to the embodiment.

As FIG. 6 illustrates, the movement unit 20 is configured as one unit to include a movement frame 21, the gauge head 24 swingably supported by the movement frame 21, a crown gear 26 as an indicating needle driving gear rotatably supported by the movement frame 21, and a magnifying transmission mechanism 31 provided in the movement frame 21 to magnify and transmit a swing amount of the gauge head 24 to a rotation amount of the crown gear 26. The movement frame 21 includes a pair of pressed ground planes 22 and a spacer 23 held between the pair of the ground planes 22. The gauge head 24 is swingably supported between the pair of the ground planes 22 via the swing axis 25. The crown gear 26 is rotatably supported between the pair of the ground planes 22 and centered on an axis (rotation axis 27) parallel to the swing axis 25 of the gauge head 24.

The magnifying transmission mechanism 31 is configured to include a first arm 32 integrally provided on the swing axis 25 projecting to an opposite side of the gauge head 24; a second arm 36 rotatably supported at a base end side between the pair of the ground planes 22 and having a sector gear 35 on a foremost end side; and a pinion 39 rotatably supported between the pair of the ground planes 22 on the same axis (the rotation axis 27) as the crown gear 26 and engaging the sector gear 35. The first arm 32 has a first contact portion 33 formed at a middle part thereof and a second contact portion 34 formed at a foremost end part. The second arm 36 has a supporting axis 37 on the based end side rotatably supported between the pair of the ground planes 22, and has a pair of transmission pins 38a and 38b implanted thereon. One on each side of the supporting axis 37, the transmission pins 38a and 38b are brought into contact with the first contact portion 33 and the second contact portion 34 of the first arm 32 from mutually opposite sides. The second arm 36 is biased by a wire spring (not shown in the figure) to rotate counterclockwise centered on the supporting axis 37.

<Explanation of the Dial Unit>

As FIG. 1 illustrates, the dial unit 40 is configured as one unit to include a dial frame 41, an indicating needle 42 rotatably provided in the dial frame 41, a scale plate 43 provided in the dial frame 41 along a rotation area of the indicating needle 42, and a pinion 44 supported by the dial frame 41 and transmitting rotation of the crown gear 26 of the movement unit 20 to the indicating needle 42. The pinion 44 is configured to be rotatable centered on an axis perpendicular to the rotation axis 27 of the crown gear 26. When the dial unit 40 is mounted on outer surfaces of the body cases 10A-10D, the pinion 44 is inserted into the body cases 10A-10D from the apertures 15A-15D of the body cases 10A-10D, and is engaged by the crown gear 26.

<Method of Assembling>

Figure 7:
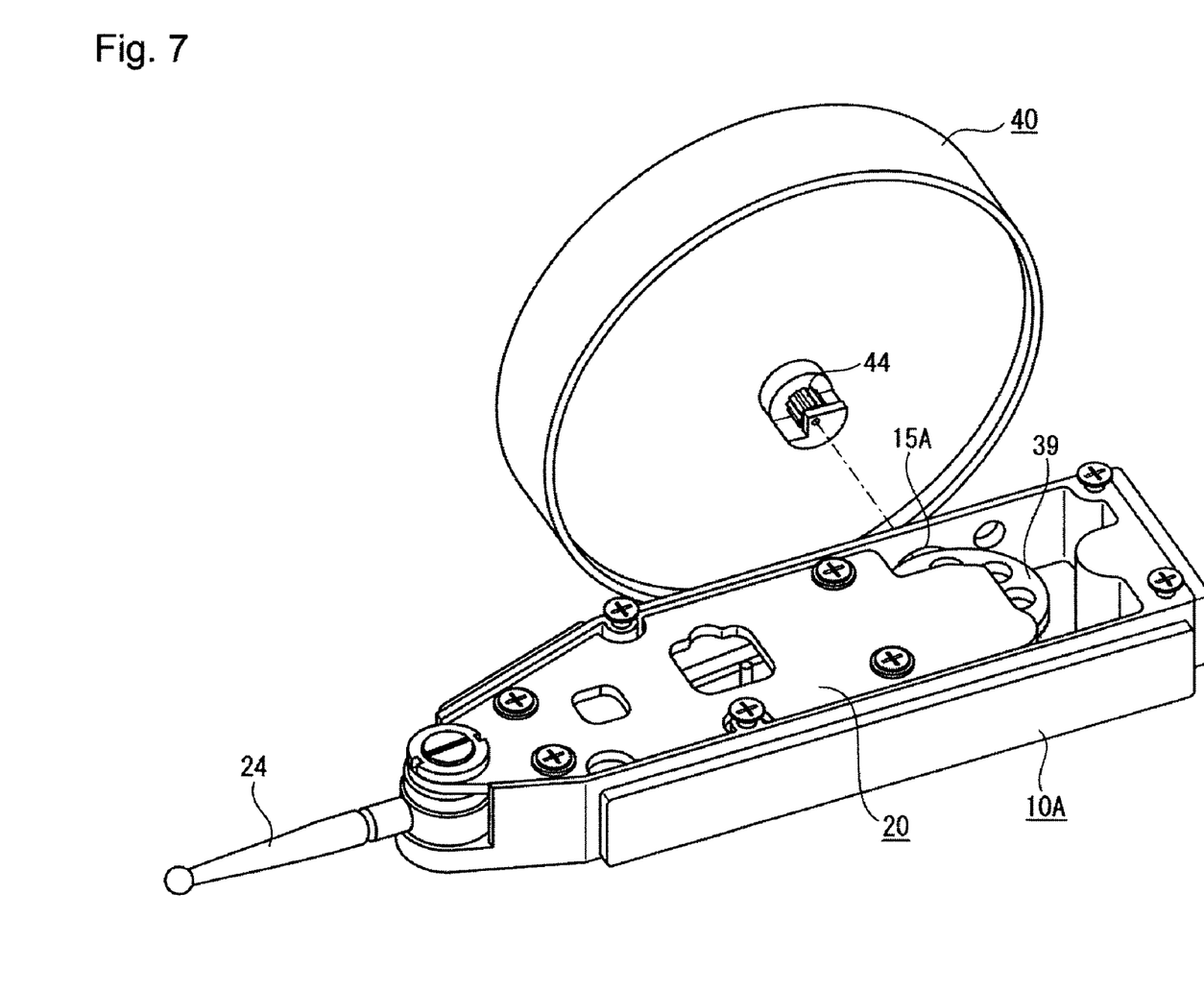
FIG. 7 is a perspective view illustrating a state in which a dial unit is being mounted on a first body case according to the embodiment.
Figure 8:
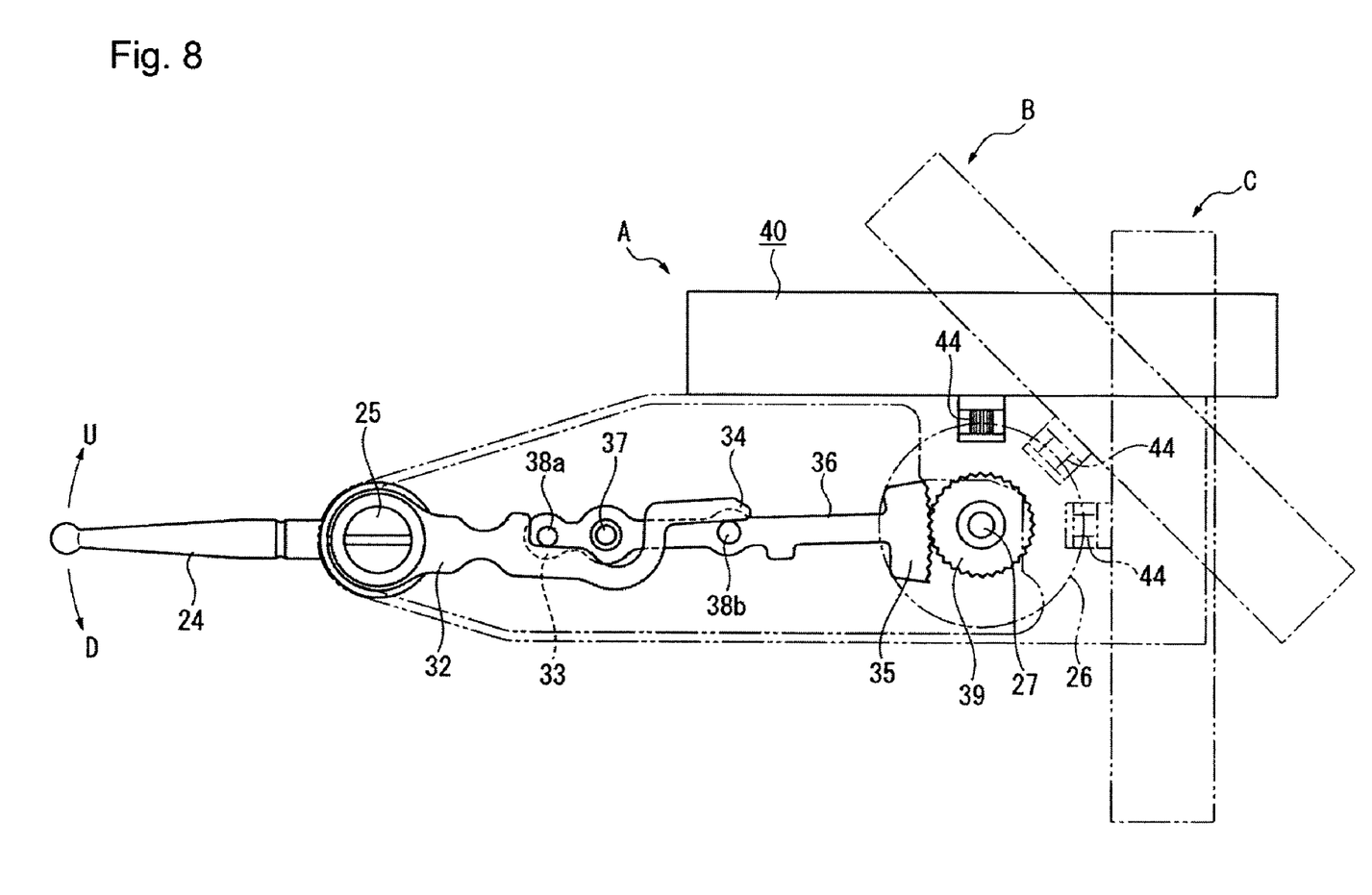
FIG. 8 is a front view illustrating a state in which the dial unit has been mounted on the first body case according to the embodiment.

To assemble the longitudinal type test indicator A, the first body case 10A is selected. As FIG. 7 illustrates, after the movement unit 20 is housed and fixed in the first body case 10A, the pinion 44 of the dial unit 40 is inserted into the first body case 10A from the aperture 15A of the first body case 10A, and the dial unit 40 is fixed on the body case 10A. When this is done, as FIG. 8 illustrates, the pinion 44 of the dial unit 40 is in a state engaged with the crown gear 26 of the movement unit 20.

In this state, when the gauge head 24 swings from the neutral position, the first arm 32 rotates the second arm 36 toward the same direction centered on the supporting axis 37. When the gauge head 24 swings toward a U direction from the neutral position, the second contact portion 34 of the first arm 32 pushes the transmission pin 38b to rotate the second arm 36 in a clockwise direction centered on the supporting axis 37. On the other hand, when the gauge head 24 swings toward a D direction, the first contact portion 33 of the first arm 32 pushes the transmission pin 38a to rotate the second arm 36 in the clockwise direction centered on the supporting axis 37. Therefore, even when the gauge head 24 swings back and forth from the neutral position in either direction, the second arm 36 always rotates in the clockwise direction. Then, the pinion 39 engaged with the sector gear 35 of the second arm 36, the crown gear 26, and the pinion 44 also rotate in the same direction. As a result, the indicating needle 42 also rotates in the same direction. That is, a swing amount of the gauge head 24 is magnified and converted into a rotation amount of the indicating needle 42 and is displayed. Therefore, by reading off the rotation amount of the indicating needle 42, the swing amount of the gauge head 24 can be measured.

To assemble the gradient type test indicator B, the second body case 10B is selected. After the movement unit 20 is housed and fixed in the second body case 10B, the pinion 44 of the dial unit 40 is inserted into the second body case 10B from the aperture 15B of the second body case 10B, and the dial unit 40 is fixed on the second body case 10B. When this is done, as illustrated by the dashed two-dotted line in FIG. 8, the pinion 44 of the dial unit 40 is in a state engaged with the crown gear 26 of the movement unit 20. Therefore, the gradient type test indicator B can be configured.

To assemble the vertical type test indicator C, the third body case 10C is selected. After the movement unit 20 is housed and fixed in the third body case 10C, the pinion 44 of the dial unit 40 is inserted into the third body case 10C from the aperture 15C of the third body case 10C, and the dial unit 40 is fixed on the body case 10C. When this is done, as illustrated by the dashed two-dotted line in FIG. 8, the pinion 44 of the dial unit 40 is in a state engaged with the crown gear 26 of the movement unit 20. Therefore, the vertical type test indicator C can be configured.

Figure 9:
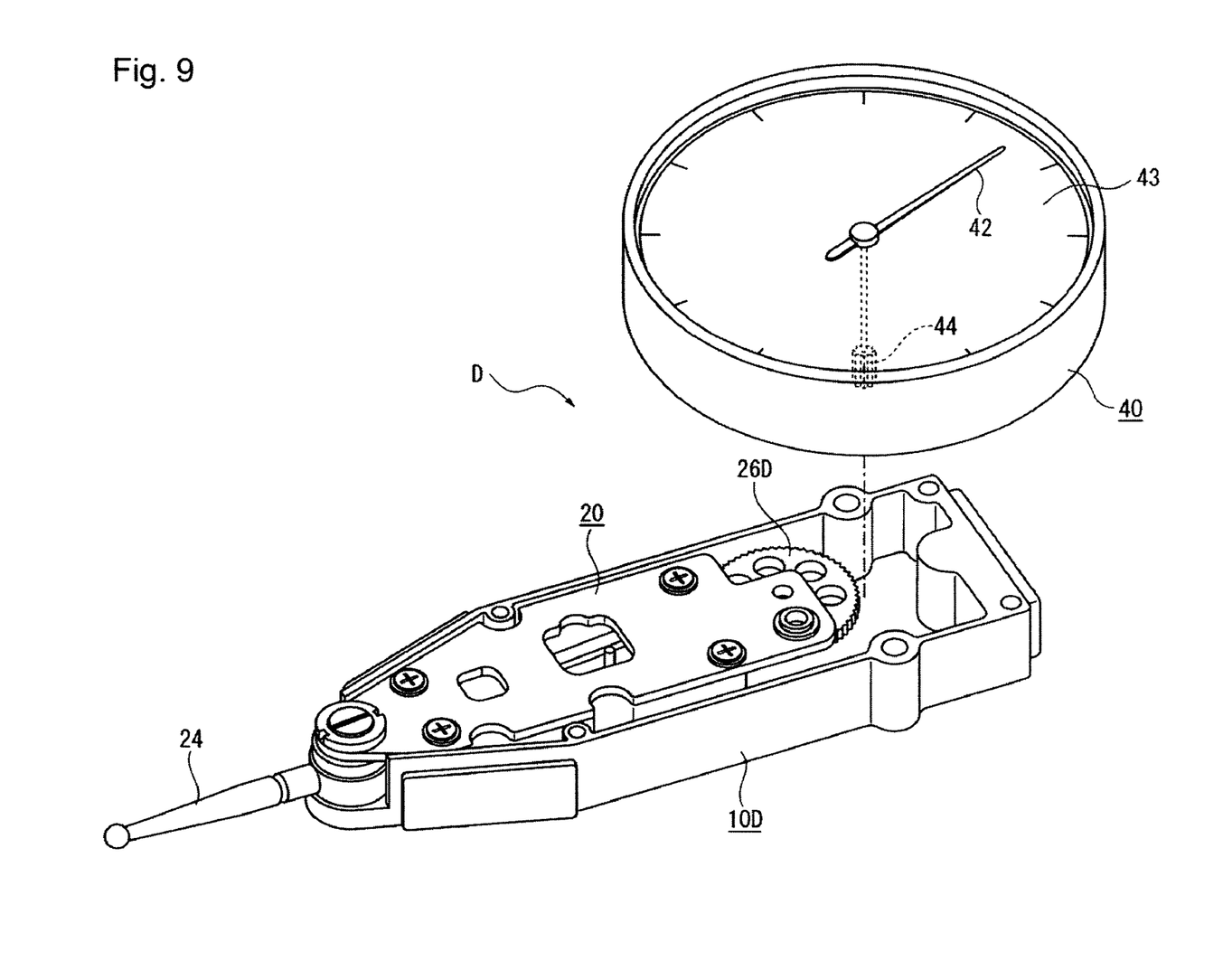
FIG. 9 is a perspective view illustrating a state in which the dial unit is being mounted on a fourth body case according to the embodiment.

To assemble the horizontal type test indicator D, the fourth body case 10D is selected. The movement unit 20 is housed and fixed in the fourth body case 10D. Only in this case, as FIG. 9 illustrates, among the parts installed in the movement unit 20, a spur gear 26D is installed in place of the crown gear 26 in the movement unit 20. Then, the pinion 44 of the dial unit 40 is inserted into the fourth body case 10D from the aperture 15D of the fourth body case 10D, and the dial unit 40 is fixed on the fourth body case 10D. When this is done, the pinion 44 of the dial unit 40 is in a state engaged with the spur gear 26D of the movement unit 20. Therefore, the horizontal type test indicator D can be configured.

<Effects of the Embodiment>

(1) Among the parts configuring the longitudinal type test indicator A, the gradient type test indicator B, the vertical type test indicator C and the horizontal type test indicator D, the movement unit 20 and the dial unit 40 are communalized. Therefore, cost reduction is possible.

(2) The movement unit 20 is configured as one unit to include the movement frame 21, the gauge head 24, the crown gear 26, and the magnifying transmission mechanism 31. Therefore, when assembling the movement unit 20, the gauge head 24 can also be installed together in the movement unit 20. Therefore, the assembling process of the gauge head 24 can easily be performed without the need of proficiency. That is, it is not necessary to insert a gauge head having a first arm into a body case from a gauge head insertion opening after a movement is installed in a recess of the body case, as in the conventional way. Therefore, the problem associated therewith can be resolved. Further, only the gauge head 24, the crown gear 26 and the magnifying transmission mechanism 31 are installed in the movement frame 21. Therefore, inter-axis precision of these parts is easily ensured.

(3) The movement frame 21 is configured to include the pair of the pressed ground planes 22 and the spacer 23 held between the pair of the ground planes 22. The gauge head 24, the crown gear 26, and the magnifying transmission mechanism 31 are held between the pair of the ground planes 22. That is, axis bearings can be pressed for holding the gauge head 24, the crown gear 26, and the magnifying transmission mechanism 31 between the pair of ground planes 22. Therefore, high inter-axis precision work can be performed. In particular, when work of the pair of the ground planes 22 is performed using a same progressive press die, inter-axis precision of the pair of the ground planes 22 can be made exactly the same. Therefore, parts of high inter-axis precision can be produced. Therefore, each element can be made of high inter-axis precision, which enables realization of high precision.

(4) The pinion 44 of the dial unit 40 is configured to be rotatable centering on an axis perpendicular to the rotation axis 27 of the crown gear 26. The body cases 10A-10C have apertures 15A-15C on wall surfaces facing different tooth positions of the crown gear 26. Therefore, the orientation of the dial unit 40 with respect to the body cases 10A-10C can be changed while maintaining an engaging relation between the crown gear 26 and the pinion 44. Therefore, by preparing the body cases 10A-10C in different shapes, test indicators having differently oriented dial unit 40 can be configured. That is, by changing only the body cases 10A-10C, test indicators having differently oriented dial unit 40 can be formed. Therefore, test indicators suitable for intended purposes can be provided at low cost.

<Examples of Modifications>

The present invention is not limited to the above described embodiment. Modifications, improvements and the like within the scope of achieving the purpose of the present invention are included in the present invention. For example, the magnifying transmission mechanism 31 is not limited to the structure described in the above described embodiment, that is, the structure including the first arm 32, the second arm 36 having the sector gear 35, and the pinion 39. For example, it is also possible to have a gear train structure combining a plurality of gears.

In the assembling method of the above described embodiment, after the movement unit 20 is installed in the body cases 10A-10D, the dial unit 40 is installed on the body cases 10A-10D. However, except for the horizontal type test indicator D, the installation order of the movement unit 20 and the dial unit 40 may be reversed for the other longitudinal, gradient and vertical type test indicators A-C. That is, it is also possible to first install the dial unit 40 on the body cases 10A-10C, and then install the movement unit 20 in the body cases 10A-10C.

The present invention can be utilized as a test indicator displaying a swing amount of a gauge head as a rotation amount of indicating needle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A test indicator displaying a swing amount of a gauge head as a rotation amount of an indicating needle, comprising:
   a body case;
   a movement unit housed in the body case; and
   a dial mounted on the body case,
   wherein the movement unit is configured as a single unit comprising:
      a movement frame, wherein the gauge head is swingably supported by the movement frame;
      an indicating needle driving gear rotatably supported by the movement frame; and
      a magnifying transmission mechanism provided in the movement frame and configured to magnify and transmit the swing amount of the gauge head to a rotation amount of the indicating needle driving gear, and
   wherein the dial is configured as a single unit comprising:
      a dial frame, wherein the indicating needle is rotatably provided in the dial frame;
      a scale plate provided in the dial frame along a rotation area of the indicating needle; and
      a pinion supported by the dial frame and configured to transmit rotation of the indicating needle driving gear to the indicating needle.

2. The test indicator according to claim 1, wherein the movement frame comprises:
   a pair of pressed ground planes; and
   a spacer held between the pair of the ground planes, wherein the gauge head, the indicating needle driving gear and the magnifying transmission mechanism are held between the pair of the ground planes.

3. The test indicator according to claim 1, wherein the indicating needle driving gear is a crown gear rotatable centering on an axis parallel to a swing axis of the gauge head, the pinion is rotatable centering on an axis perpendicular to a rotation axis of the crown gear, and
   the body case is one of a plurality of body cases each having an aperture formed on a wall surface facing a different tooth position of the crown gear.

4. The test indicator according to claim 3, wherein the plurality of body cases comprise a first body case, a second body case and a third body case, the first body case type having the aperture formed on a wall surface parallel to a gauge head axis line of the gauge head in a neutral state and a swing axis of the gauge head, the second body case having the aperture formed on a wall surface inclining with respect to the gauge head axis line and the swing axis, and the third body case having the aperture formed on a wall surface perpendicular to the gauge head axis line and parallel to the swing axis.

5. The test indicator according to claim 2, wherein the indicating needle driving gear is a crown gear rotatable centering on an axis parallel to a swing axis of the gauge head,
   the pinion is rotatable centering on an axis perpendicular to a rotation axis of the crown gear, and
   the body case is one of a plurality of body cases each having an aperture formed on a wall surface facing a different tooth position of the crown gear.

6. The test indicator according to claim 5, wherein the plurality of body cases comprise a first body case, a second body case and a third body case, the first body case type having the aperture formed on a wall surface parallel to a gauge head axis line of the gauge head in a neutral state and a swing axis of the gauge head, the second body case having the aperture formed on a wall surface inclining with respect to the gauge head axis line and the swing axis, and the third body case having the aperture formed on a wall surface perpendicular to the gauge head axis line and parallel to the swing axis.

* * * * *